(12) United States Patent
Oonishi et al.

(10) Patent No.: US 10,811,949 B2
(45) Date of Patent: Oct. 20, 2020

(54) VIBRATION POWER GENERATOR WITH ELASTIC MEMBERS FIXED TO A HOUSING AND COILS POISTIONED BETWEEN MAGNETS

(71) Applicant: Kabushiki Kaisha Toshiba, Minato-ku (JP)

(72) Inventors: Atsuro Oonishi, Tokyo (JP); Akihito Ogawa, Fujisawa (JP); Hiroshi Takahashi, Yokohama (JP); Akihiko Enamito, Kawasaki (JP); Junichiro Ooga, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 690 days.

(21) Appl. No.: 15/443,412

(22) Filed: Feb. 27, 2017

(65) Prior Publication Data
US 2017/0366077 A1    Dec. 21, 2017

(30) Foreign Application Priority Data
Jun. 20, 2016   (JP) .................................. 2016-121917

(51) Int. Cl.
*H02K 35/02*     (2006.01)
*H02J 1/00*      (2006.01)
*H02K 11/04*     (2016.01)

(52) U.S. Cl.
CPC .............. *H02K 35/02* (2013.01); *H02J 1/00* (2013.01); *H02K 11/046* (2013.01)

(58) Field of Classification Search
CPC ...... H02K 35/00; H02K 35/02; H02K 11/046; H02K 7/1869; H02K 7/1876; H02K 41/02;

(Continued)

(56) References Cited

U.S. PATENT DOCUMENTS 6,501,357 B2*  12/2002  Petro ........................ H01F 7/13
                                                        310/17
6,983,923 B2*   1/2006  Fukui ................... A61B 5/0235
                                                        251/65

(Continued)

FOREIGN PATENT DOCUMENTS

CN    101510717 A    8/2009
JP    11-32470       2/1999

(Continued)

OTHER PUBLICATIONS

WO-2016076382-A1 English Translation.*

*Primary Examiner* — Maged M Almawri
(74) *Attorney, Agent, or Firm* — Oblon, McClelland, Maier & Neustadt, L.L.P.

(57) ABSTRACT

According to one embodiment, a vibration power generator includes a housing, an elastic member, a mover, and a coil. The elastic member is fixed to the housing. The mover is supported by the elastic member and able to vibrate in a first direction. The coil is positioned inside the mover. The mover includes a first magnet, a second magnet, a third magnet, and a first magnetic yoke. The second magnet is placed to be aligned with the first magnet in the first direction so as to repel each other. The third magnet is placed annularly with respect to the first magnet and the second magnet. The first magnetic yoke surrounds the first magnet, the second magnet and the third magnet. The coil is positioned between the third magnet, and both the first magnet and the second magnet.

11 Claims, 7 Drawing Sheets

(58) Field of Classification Search
CPC ........... H02K 33/00; H02J 1/00; H02N 11/00;
H02N 11/002
USPC ......... 310/12.12, 12.01, 12.03, 12.13, 12.16,
310/12.26, 25, 15; 335/229
See application file for complete search history.

(56) References Cited

U.S. PATENT DOCUMENTS

| | | | | |
|---|---|---|---|---|
| 7,449,803 | B2 * | 11/2008 | Sahyoun ................ | H02K 33/16 310/14 |
| 7,586,220 | B2 * | 9/2009 | Roberts ................. | H02K 35/02 310/15 |
| 8,736,086 | B2 * | 5/2014 | Yang ...................... | H02K 35/02 290/1 R |
| 9,356,499 | B2 * | 5/2016 | Kinoshita .............. | H02K 35/02 |
| 9,695,806 | B2 * | 7/2017 | Van Brunt ............. | F04B 17/04 |
| 2005/0225181 | A1 * | 10/2005 | Tu .......................... | H01F 7/021 310/12.12 |
| 2007/0052302 | A1 * | 3/2007 | Cheung ................. | B82Y 25/00 310/12.12 |
| 2008/0084121 | A1 | 4/2008 | Kelly | |
| 2008/0265692 | A1 | 10/2008 | Roberts | |
| 2009/0250032 | A1 * | 10/2009 | Fullerton ................ | F02P 3/02 123/143 B |
| 2011/0198949 | A1 * | 8/2011 | Furuich ................. | H02K 33/16 310/25 |
| 2012/0146557 | A1 * | 6/2012 | Pyo ....................... | G11B 5/1278 318/129 |
| 2013/0285479 | A1 * | 10/2013 | Kinoshita .............. | H02K 35/02 310/12.12 |
| 2016/0126821 | A1 * | 5/2016 | Iwaki ..................... | H02K 33/16 310/12.21 |
| 2016/0276915 | A1 | 9/2016 | Oonishi et al. | |

FOREIGN PATENT DOCUMENTS

| | | | |
|---|---|---|---|
| JP | 2008-527958 | 7/2008 | |
| JP | 2010-279145 | 12/2010 | |
| JP | 2012-39824 | 2/2012 | |
| JP | 2012-70535 | 4/2012 | |
| JP | 2012-205497 A | 10/2012 | |
| JP | 2013-135544 | 7/2013 | |
| JP | 5248598 | 7/2013 | |
| JP | 2014-204493 | 10/2014 | |
| JP | 2016-25818 A | 2/2016 | |
| JP | 2016-96662 A | 5/2016 | |
| JP | 2016-178821 | 10/2016 | |
| WO | WO-2012073980 A1 * | 6/2012 | ............. H02K 35/02 |
| WO | WO 2015/191045 A1 | 12/2015 | |
| WO | WO-2016076382 A1 * | 5/2016 | ............. H02K 35/00 |

* cited by examiner

VIBRATION POWER GENERATOR WITH ELASTIC MEMBERS FIXED TO A HOUSING AND COILS POISTIONED BETWEEN MAGNETS

CROSS-REFERENCE TO RELATED APPLICATION

This application is based upon and claims the benefit of priority from Japanese Patent Application No. 2016-121917, filed on Jun. 20, 2016; the entire contents of which are incorporated herein by reference.

FIELD

Embodiments described herein relate generally to a vibration power generator, a vibration power generating unit, a vibration power generating module, and an electrical device.

BACKGROUND

A vibration power generator uses environmental vibration, such as floor vibration caused by people walking, vibration caused by cars and trains, and vibration caused by rain beating against the ground, to generate electricity. Electric power generated by the vibration power generator is expected to be an alternative to a power source (a battery or the like) used in a sensor or the like.

An electromagnetic vibration power generator generally includes a coil and a mover having a magnet. The mover makes a motion relative to the coil when external vibration has been applied to the vibration power generator. At this time, the magnetic flux linkage varies over time, whereby an electromotive force is generated.

To increase electric energy generated by the electromagnetic vibration power generator, there is a method to increase the magnitude of the magnetic flux linkage by using a magnet having good magnetic characteristics or by optimizing a magnetic circuit and so on.

DETAILED DESCRIPTION

According to one embodiment, a vibration power generator includes a housing, an elastic member, a mover, and a coil. The elastic member is fixed to the housing. The mover is supported by the elastic member and able to vibrate in a first direction. The coil is positioned inside the mover. The mover includes a first magnet, a second magnet, a third magnet, and a first magnetic yoke. The second magnet is placed to be aligned with the first magnet in the first direction so as to repel each other. The third magnet is placed annularly with respect to the first magnet and the second magnet. The first magnetic yoke surrounds the first magnet, the second magnet and the third magnet. The coil is positioned between the third magnet, and both the first magnet and the second magnet.

Vibration power generators according to embodiments are described below with reference to drawings. Having the same reference numeral means the same component. Incidentally, the drawings are schematic or conceptual, a relationship between the thickness and width of each part, the dimensional ratio between parts, etc. are not necessarily the same as actual ones. Furthermore, even the same part may be depicted in the different dimensions or dimensional ratio among the drawings.

First Embodiment

Figure 1:
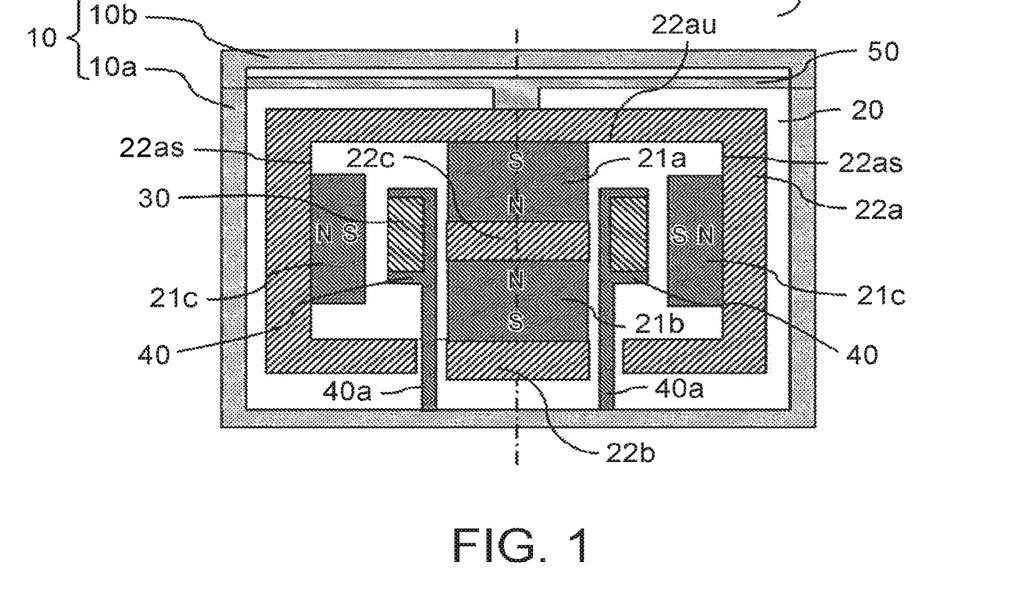
FIG. 1 is a cross-sectional view showing an outline of a vibration power generator according to a first embodiment.
Figure 2:
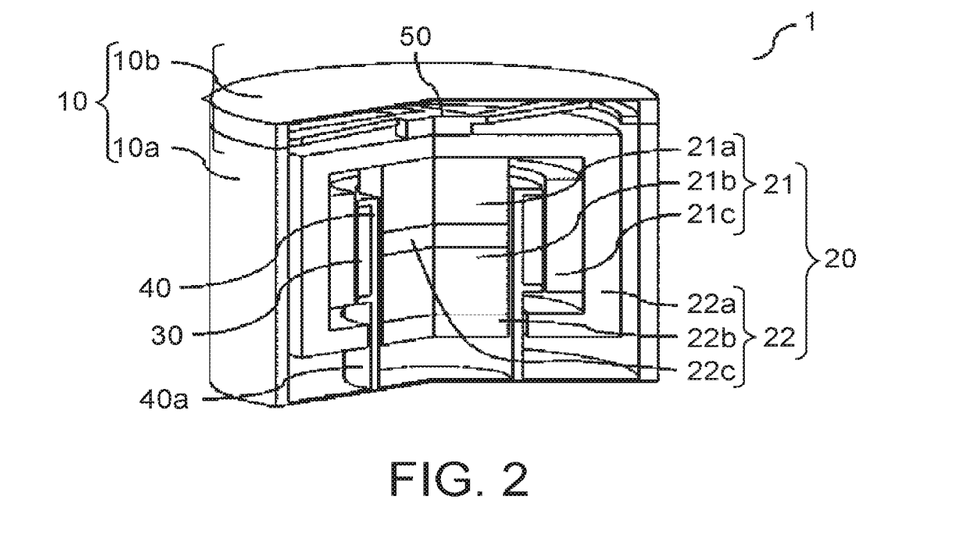
FIG. 2 is a perspective cross-sectional view of the vibration power generator according to the first embodiment.
Figure 3:
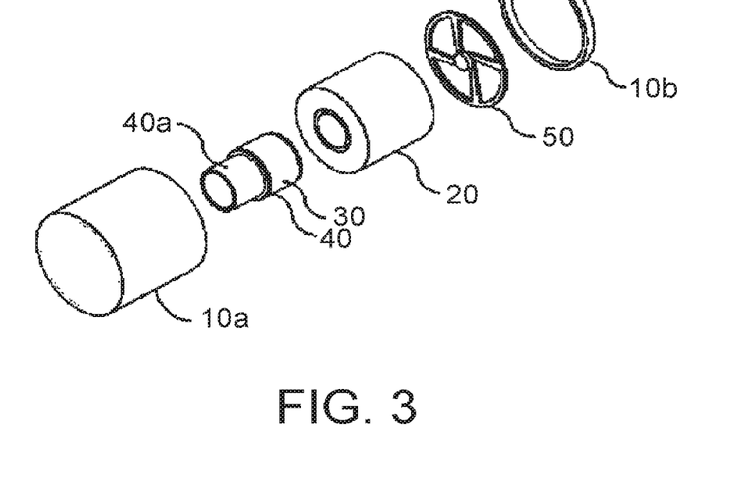
FIG. 3 is an exploded view of the vibration power generator according to the first embodiment.

A first embodiment is described with reference to FIGS. 1 to 3. FIG. 1 is a cross-sectional view showing an outline of a vibration power generator 1 according to the first embodiment. FIG. 2 is a perspective cross-sectional view of the vibration power generator 1. FIG. 3 is an exploded view of the vibration power generator 1.

As shown in FIG. 3, the vibration power generator 1 includes a case 10 configuring the outer shell of the vibration power generator 1, the case 10 including a bottomed tubular case 10a and a case cover 10b provided as a lid of an opening of the case 10a. Inside the case 10, there are provided a columnar mover 20, an annular coil 30 placed inside the mover 20, a coil fixing member 40 for fixing the coil 30 at a fixed distance from the bottom of the case 10a, and a discoid elastic member 50 that is fixed to the case cover 10b and supports the mover 20. The central axis of the mover 20 is placed along approximately the central axis of the tubular case 10.

Subsequently, a configuration of the mover 20 in the present embodiment is described in detail.

As shown in FIGS. 1 and 2, the mover 20 includes a magnet 21 and a yoke 22 for holding the magnet 21, the yoke 22 including yokes 22a, 22b, and 22c. The top center of the yoke 22 is connected to the elastic member 50 near the central axis of the case 10.

The yoke 22 includes the cylindrical yoke 22a and the yokes 22b and 22c placed at a predetermined distance along the central axis of the case 10. Along the central axis of the case 10, a magnet 21a is placed between the upper surface of the yoke 22c and the yoke 22a, and a magnet 21b is placed between the lower surface of the yoke 22c and the yoke 22b.

On the other hand, a tubular magnet 21c is placed on the inner surface of the yoke 22a away from the central axis of the case 10. Spaces are left between the magnet 21c and the magnets 21a, 21b on the central axis of the case 10. In the space inside this mover 20, the coil 30 to be described later is placed.

The magnets 21a and 21b are formed into a columnar shape or a prismatic shape. It is preferable that the magnets 21a and 21b have the same shape. It is preferable that the yoke 22c has a shape identical to the shape of the bottom surface of the magnet 21a. The central axis of the mover 20 roughly coincides with the central axis of the coil 30.

The magnet 21a, the magnet 21b, and the yoke 22c are placed inside the coil 30 so that there is a gap between the magnet 21a, the magnet 21b, the yoke 22c, and the coil 30. That is, there is a gap between the magnet 21a, the magnet 21b, the yoke 22c, and the coil fixing member 40 as well. It is preferable that the yoke 22c is placed at the position roughly corresponding to the center of the coil 30 in a thickness direction. Furthermore, it is preferable that the thickness of the yoke 22c is thinner than that of the coil. The thickness here means the length in a direction along the central axis of the mover 20.

The magnetic poles of the magnets 21a and 21b are placed so that the north and south poles are aligned along the central axis of the mover 20, and respective magnetic poles on the side in contact with the yoke 22c are the north poles facing each other. That is, the magnets 21a and 21b generate a magnetic flux in a direction where the magnets 21a and 21b repel each other.

The yoke 22a has a hollow columnar shape, and is placed so as to surround the magnets 21a to 21c and the yoke 22c. An inner-wall upper surface 22au of the yoke 22a is placed in contact with the magnet 21a. The upper surface of the yoke 22b is placed in contact with the magnet 21b. An internal side surface 22as of the yoke 22a is placed in contact with the magnet 21c. The magnet 21c has preferably an annular shape, and is placed concentrically on the outside of the coil 30. There is a fixed gap between the magnet 21c and the coil 30. The magnet 21c is preferably formed into a one-piece annulus. However, the magnet 21c can be formed to be circumferentially divided into several parts, or can be formed to be axially divided into several parts.

The magnet 21c has the magnetic poles in a radial direction. The magnetic pole of the magnet 21c on the side facing the coil 30 is the south pole, and the magnetic pole of the magnet 21c on the side in contact with the yoke 22a is the north pole.

The yoke 22b is placed in contact with the south-pole side of the magnet 21b. In the case where a coil support part 40a of the coil fixing member 40 has a pillar shape (for example, a shape of supporting the coil by four pillars), the yoke 22b is integrally formed with the yoke 22a.

The yoke 22a is not limited to be formed into a one-piece part, and can be formed to be axially divided into two parts.

It is preferable that material of the yokes 22a to 22c is soft magnetic material and also material with low coercivity and high magnetic permeability. For example, material of the yokes 22a to 22c is iron, silicon steel, electromagnetic soft iron, SPCC, or the like. The yokes are also called magnetic bodies.

Furthermore, as material of the yokes for the vibration power generator, high-density material such as permalloy is preferable.

The magnets 21a to 21c are permanent magnets, and general magnets, such as neodymium magnets or ferrite magnets, can be used.

The mover 20 forms a magnetic circuit closed by the yokes 22a to 22c and the magnets 21a to 21c.

Subsequently, a magnetic flux path in the mover 20 is described.

The magnets 21a and 21b are attached to the yoke 22c with respective north poles facing each other. A magnetic flux radially leaking from the yoke 22c penetrates the coil 30, and passes through the magnet 21c and the yoke 22a in contact with the magnet 21c, and then returns to the magnets 21a and 21b. The yoke 22b in contact with the magnet 21b is also the path of the magnetic flux.

The magnet 21c prevents the magnetic flux radially leaking from the side surface of the yoke 22c from spreading. Accordingly, the magnitude of the magnetic flux linkage increases. By arranging the magnets 21a to 21c in this way, the amount of the magnetic flux linkage can be increased, and the amount of power generation can be improved.

The coil 30 is an annular multi-wound coil. The central axis of the annular coil 30 is placed so as to coincide with the central axis of the mover 20. The coil 30 is wound in a circumferential direction.

As wire used in the coil, copper wire, aluminum wire, or copper-clad aluminum wire (CCAW) can be used. In the case of using copper-clad aluminum wire, the percentage of copper content and the percentage of aluminum content can be set freely. For example, the percentage of copper content can be selected to be 5%, 10%, or 15%. As aluminum and copper differ in density, if the coil 30 is composed of aluminum wire (Al—100%), the mass of the coil 30 can be reduced. If the coil 30 is composed of copper (Cu—100%), the mass of the coil 30 can be increased. As will be described later, by selecting wire appropriately, the natural frequency of the coil 30 can be changed. Furthermore, it is preferable that the coil 30 is densely wound. Coil wire is generally round in cross-section. However, wire which is square in cross-section can be used. By increasing the number of the magnetic fluxes linkage, the amount of power generation can be improved.

The end of the coil wire is pulled out of the vibration power generator 1, and is connected to an output circuit to be described later or the like.

The coil fixing member 40 is a member for fixing the coil 30 to the inside of the mover 20. The coil fixing member 40 has the pillar-like coil support part 40a, and the coil support part 40a is fixed to the bottom surface of the case 10a. That is, the coil 30 is supported by the coil support part 40a from an axial direction. As described above, the coil support part 40a is a part that actually supports the coil, and the shape of the coil support part 40a can be a pillar shape, or can be a cylindrical shape. In the case of a pillar shape, it is preferable that the coil is supported by a plurality of pillars. It is preferable that the coil fixing member 40 is made from nonmagnetic material and insulating material. For example, resin material, such as polyethylene, polypropylene, acrylic resin, and ABS resin, a glass epoxy member, and ceramics can be used.

The coil fixing member 40 is placed so that there is a gap between the coil fixing member 40 and the magnets 21a to 21c, the yoke 22b, and the yoke 22c.

The elastic member 50 has a discoid shape as shown in FIGS. 1 to 3. The side surface of the elastic member 50 is fixed to the internal side surface of the case 10, and supports a part of the upper surface of the mover 20 near the center of the disc. The side surface of the elastic member 50 can be fixed to the internal side surface of the case 10a, or can be fixed to the internal side surface of the case cover 10b. As shown in FIGS. 1 and 2, the mover 20 is suspended from the elastic member 50 inside the case 10.

It is preferable that the elastic member 50 is made from material that is high in strength and hard to break, and has low damping capacity. For example, stainless steel for spring, austenitic stainless steel, or the like is preferable. The elastic member 50 can be something like a leaf spring or a disc spring. Material of the elastic member 50 can be appropriately selected according to the use environment, etc. of the vibration power generator 1. Furthermore, as the shape of the elastic member 50, several through holes or the like can be formed on the elastic member 50. This enables the spring constant to be adjusted without having to change the material.

The fixing of the mover 20 and the elastic member 50 is performed by, for example, adhesion, press fitting, shrink fitting, welding, or screw clamp. The fixing of the elastic member 50 and the case 10 is performed by adhesion, press fitting, screw clamp, or the like. Alternatively, the elastic member 50 can be fixed by being held by the case 10a and the case cover 10b.

Subsequently, the case 10 is described. The case 10 contains the mover 20, the coil 30, the coil fixing member 40, and the elastic member 50. There is a gap between the case 10 and the mover 20. This gap can be set arbitrarily.

The case 10 includes two members that are the case 10a and the case cover 10b. However, these two members can be integrally formed as one part. Furthermore, it is preferable that the case 10 is formed of a nonmagnetic member. For example, aluminum or austenitic stainless steel is preferable. This is because if the case 10 is formed of a magnetic member, vibration of the mover 20 is likely to be affected. However, if the magnitude of the magnetic flux leakage from the mover 20 is small, the case 10 can be formed of magnetic material such as iron. Furthermore, the case 10 is also called a housing.

Subsequently, the operation of the vibration power generator 1 is described.

The vibration power generator 1 is attached to an object to be a source of vibration. For example, vehicles such as trains, elevating machines such as elevators, electrical appliances with large-amplitude vibration such as washing machines, etc. can be objects to which the vibration power generator 1 is attached.

The vibration power generator 1 according to the present embodiment generates electricity from axial vibration of the mover 20. Therefore, the vibration power generator 1 should be attached to an appliance with large-amplitude axial vibration.

The coil 30 fixed by the coil fixing member 40 vibrates as a unit with the case 10 when external vibration is applied to the vibration power generator 1. The mover 20 connected to the elastic member 50 vibrates at a predetermined frequency with respect to the coil 30 according to elastic force of the elastic member 50. That is, the mover 20 makes an axial motion relative to the coil 30. At this time, the magnetic flux linkage varies over time, whereby an electromotive force is generated.

The natural frequency of the mover 20 connected to the elastic member 50 depends on the spring constant of the elastic member 50 and the mass of the mover 20. For example, in order to reduce the natural frequency, the spring constant of the elastic member 50 is reduced, or the mass of the mover 20 is increased. To increase the mass of the mover 20, the magnets or the yokes can be thickened, or high-density material (for example, permalloy or the like) can be used as material of the yokes. In order to increase the natural frequency, the spring constant of the elastic member 50 is increased, or the mass of the mover 20 is reduced. To reduce the mass of the mover 20, the magnets or the yokes can be made thin, or low-density material can be used as material of the yokes.

The natural frequency of a system composed of the mover 20 and the elastic member 50 should be set so as to roughly coincide with the frequency of vibration outside of the generator. This is because if the frequency of external vibration coincides with the natural frequency, the mover 20 resonates, and the amount of power generation can be improved.

The vibration power generator 1 should be designed so as to increase the amount of power generation from a wide frequency band of external vibration. As will be described later, to increase the amount of power generation from a wide frequency band, a structure in which the coil also vibrates can be adopted. A vibration power generator should be designed to be capable of arbitrarily setting a targeted frequency or frequency band according to the external environment and be suited for the circumstances.

As described above, according to the present embodiment, the magnet 21c in the mover 20 prevents spreading of a magnetic flux output from the yoke 22c, and by interlinking the magnetic flux in a direction nearly perpendicular to a winding direction of the coil 30, the amount of power generation is expected to be increased. Furthermore, by adjusting the spring constant of the elastic member 50 or the mass of the mover 20, the natural frequency of the system composed of these can be easily changed.

Incidentally, in the above-described configuration, the magnets 21a and 21b are attached to the yoke 22c with respective north poles facing each other, and the magnetic pole of the magnet 21c on the side facing the coil 30 is the south pole, and the magnetic pole of the magnet 21c on the side in contact with the yoke 22a is the north pole. However, the pole placement is not limited to this, and the magnetic poles of all the magnets can be placed in opposite directions. That is, the magnets 21a and 21b can be attached to the yoke 22c with respective south poles facing each other, and the magnetic pole of the magnet 21c on the side facing the coil 30 can be the north pole, and the magnetic pole of the magnet 21c on the side in contact with the yoke 22a can be the south pole. The same applies to the following embodiments.

Modification of First Embodiment

Figure 4:
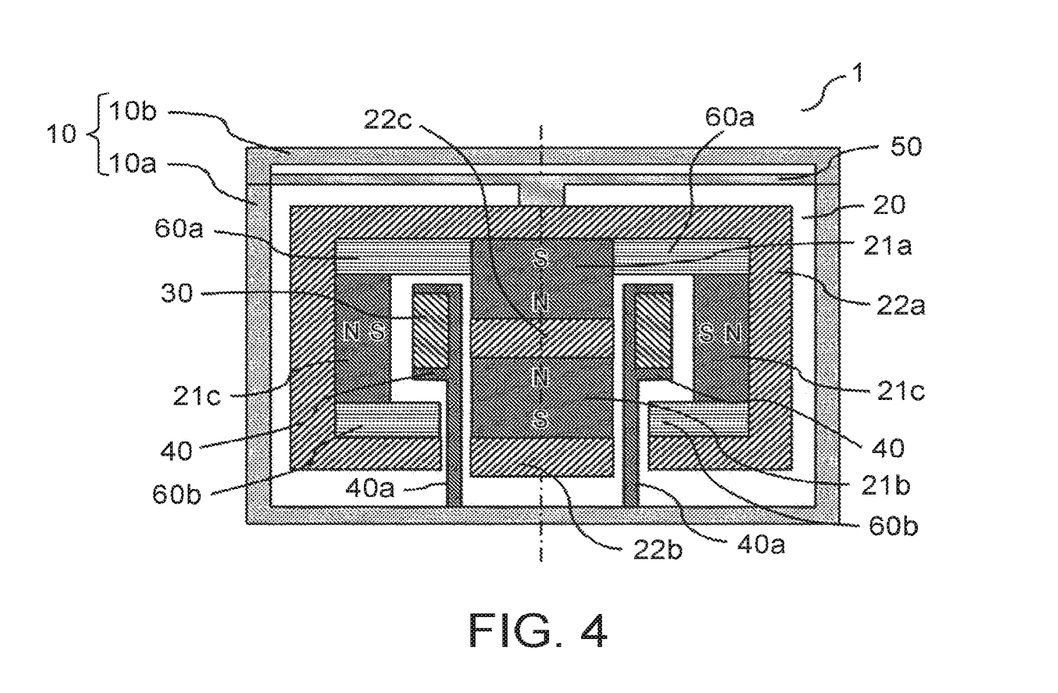
FIG. 4 is a cross-sectional view showing an outline of a vibration power generator according to a modification of the first embodiment.

A modification of the first embodiment is described with reference to FIG. 4. FIG. 4 is a cross-sectional view showing an outline of the vibration power generator 1 according to the modification of the first embodiment.

As shown in FIG. 4, a vibration power generator in the modification of the first embodiment differs from the first embodiment in that the vibration power generator includes weights 60a and 60b. Other configurations of the vibration power generator are the same as those in the first embodiment.

The weights 60a and 60b are placed in the mover 20. Specifically, the weight 60a is placed in the gap between the upper surface of the magnet 21c and the inner-wall upper surface of the yoke 22a while avoiding the magnet 21a. That is, it is preferable that the weight 60a has an annular shape. The weight 60a can be formed into a one-piece annulus, or can be formed to be divided into several parts.

The weight 60b is placed in the gap between the lower surface of the magnet 21c and the inner-wall lower surface of the yoke 22a while avoiding the magnet 21b. It is preferable that the weight 60b has an annular shape, just like the weight 60a. Furthermore, the weight 60b can be formed into a one-piece annulus, or can be formed to be divided into several parts. The weights 60a and 60b are placed to leave a gap so that the weights 60a and 60b do not come in contact with the coil 30 and the coil fixing member 40 even when the mover 20 vibrates.

It is preferable that the weights 60a and 60b are made from nonmagnetic material with high density and low magnetic permeability. This is because if magnetic material or the like with high magnetic permeability is used, the magnetic characteristics of the mover 20 may be degraded. As material used in the weights, for example, copper, tungsten, and the like can be used.

In the present embodiment, the addition of the weights can increase the mass of the mover 20, and an increase in the amplitude of vibration can improve the amount of power generation.

Furthermore, in the present embodiment, the two weights 60a and 60b are placed in the mover 20. However, one of the two weights can be placed. Moreover, the placement positions of the weights can be appropriately changed according to the design of the vibration power generator.

Second Embodiment

Figure 5:
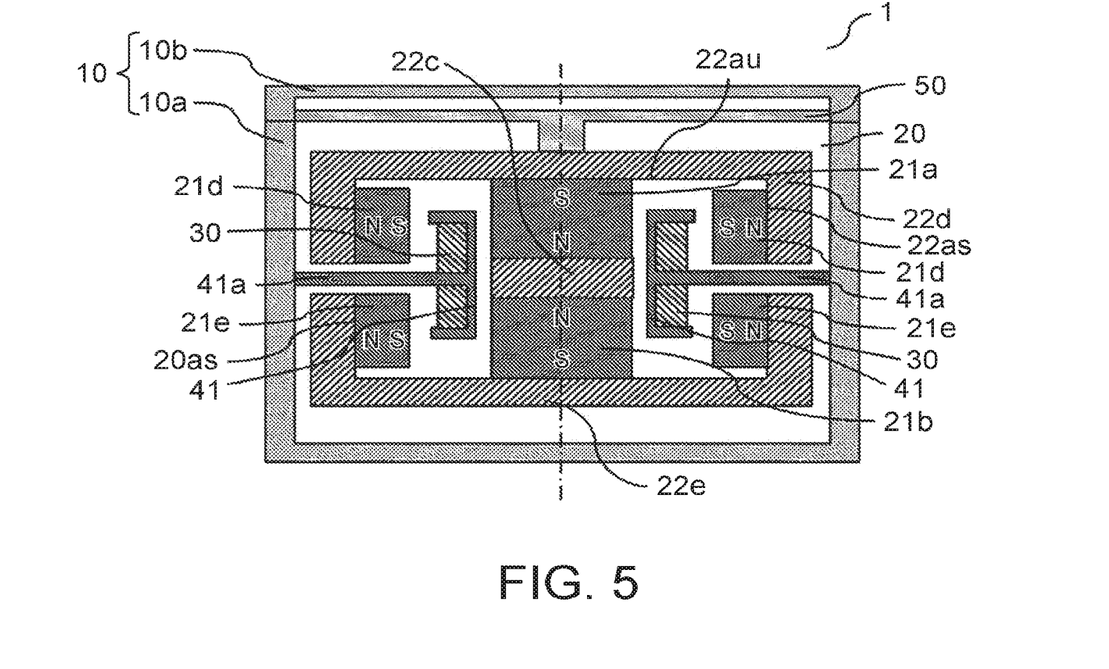
FIG. 5 is a cross-sectional view showing an outline of a vibration power generator according to a second embodiment.

A second embodiment is described with reference to FIG. 5. FIG. 5 is a cross-sectional view showing an outline of the vibration power generator 1 according to the second embodiment.

As shown in FIG. 5, a coil support part 41a of a coil fixing member 41 is fixed to the side surface of the case 10. Furthermore, the magnet 21c is axially separated into magnets 21d and 21e. The yoke 22a is axially separated into yokes 22d and 22e. In the first embodiment, the yoke 22b is on the south-pole side of the magnet 21b. However, in the present embodiment, the coil support part 41a is fixed to the side surface of the case 10, and therefore a part corresponding to the yoke 22b is integrated into the yoke 22e. Other configurations of the vibration power generator are the same as those in the first embodiment.

Figure 6:
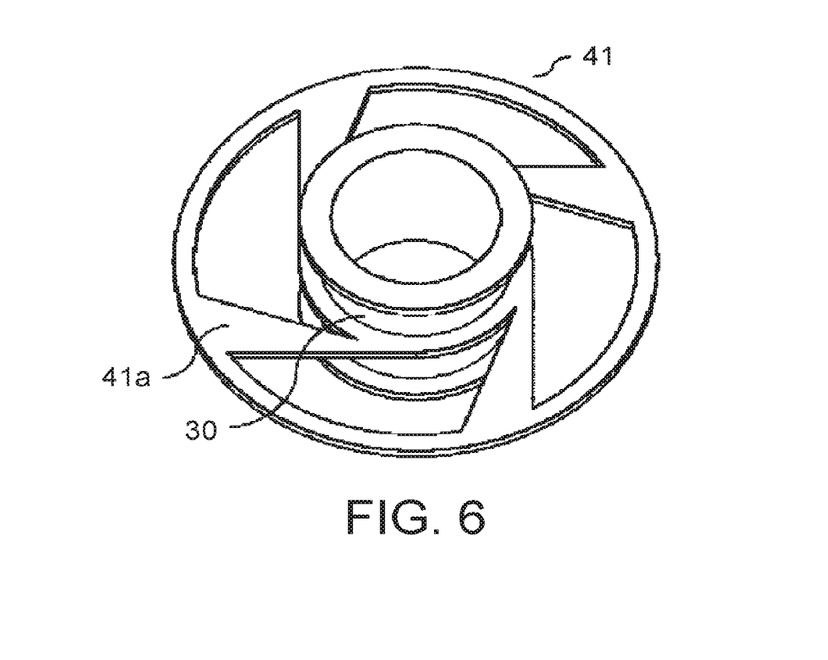
FIG. 6 is a perspective view showing an example of a coil fixing member and a coil according to the second embodiment.

FIG. 6 is a perspective view showing an example of the coil fixing member 41 and the coil 30 in the present embodiment. The coil fixing member 41 includes the discoid coil support part 41a, and a through hole or the like can be formed on the coil support part 41a. As shown in FIGS. 5 and 6, the coil 30 is fixed to the lateral surface of a cylindrical portion of the coil fixing member 41. In the case where a through hole or the like is formed on the coil support part 41a, the coil support part 41a works as a spring element against vibration in the axial direction, and vibrates the coil 30. This is because the stiffness of the coil support part 41a is reduced due to the through hole. On the other hand, in the case where the coil support part 41a has no through hole and has a flat plate-like shape, the stiffness of the coil support part 41a is high, so the coil 30 hardly vibrates in response to vibration in the axial direction. The shape of the coil support part 41a is appropriately adjusted according to a desired spring multiplier.

The magnets 21d and 21e have the magnetic poles in the radial direction, and respective magnetic poles of the magnets 21d and 21e on the side facing the coil 30 are the south pole. The side surfaces of the magnets 21d and 21e are placed in contact with the internal side surface 22as of the yoke 22a.

In the present embodiment, in response to vibration in the axial direction, the coil 30 also axially vibrates according to elastic force of the coil fixing member 41. Accordingly, the power generation can be obtained from a wider frequency band of external vibration than the vibration power generator according to the first embodiment.

Figure 7A:
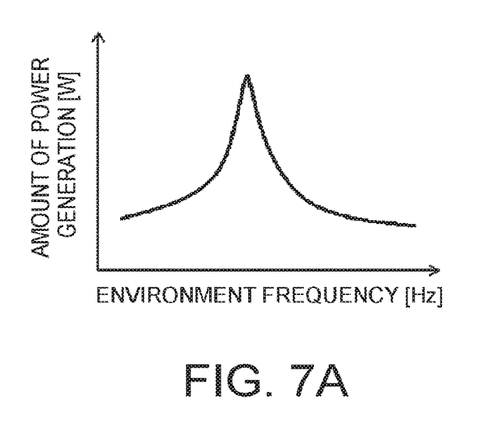
FIGS. 7A and 7B are graphs showing a relationship between external vibration and the amount of power generation in each of the vibration power generators according to the first and second embodiments.
Figure 7B:
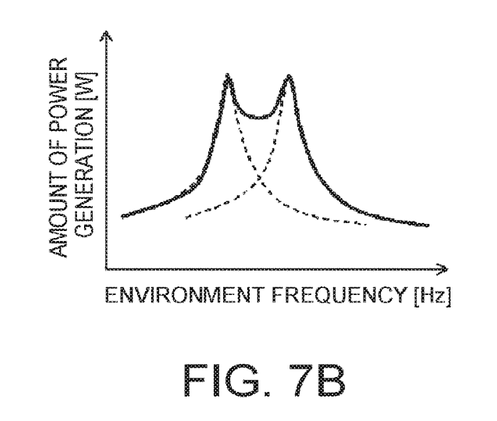

FIGS. 7A and 7B are a graph showing a relationship between external vibration and the amount of power generation in each of the vibration power generators according to the first and second embodiments. FIG. 7A shows a result for the vibration power generator according to the first embodiment. As shown in FIG. 7A, in the first embodiment, the amount of power generation peaks at a point of the natural frequency of a one-degree-of-freedom vibration system composed of the mover 20 and the elastic member 50 (hereinafter, referred to as the natural frequency of the mover). FIG. 7B shows a result for the vibration power generator according to the second embodiment. In FIG. 7B, a two-degree-of-freedom vibration system having a peak corresponding to the natural frequency defined by the coil 30 and the coil fixing member 41 (hereinafter, referred to as the natural frequency of the coil) in addition to a peak at the natural frequency of the mover 20 is formed. Accordingly, the power generation can be obtained from a wider frequency band than the one-degree-of-freedom vibration system.

The natural frequency of the coil 30 can be changed by changing the above-described wire of the coil. In order to increase the natural frequency, for example, low-density wire, such as aluminum, may be used as the coil wire, or the mass of the coil may be reduced by reducing the number of winding wires. Furthermore, the coil may be densely wound by increasing the tension when winding the coil. This is because the stiffness of the coil is improved by densely winding the coil, and the natural frequency is increased. Moreover, the stiffness may be improved by impregnating the coil with resin or the like. In order to reduce the natural frequency of the coil, high-density wire, such as copper, may be used as the coil wire, or the mass of the coil may be increased by increasing the number of winding wires. Furthermore, the natural frequency may be reduced by reducing the tension when winding the coil, thereby reducing the stiffness of the coil.

The natural frequency of the coil can be appropriately selected according to the natural frequency of the mover 20.

Moreover, the stiffness of the coil support part 41a can be increased by forming the coil support part 41a into a flat plate-like shape as described above, thereby setting the very high natural frequency relative to the natural frequency of the mover. In this case, the vibration power generator becomes exceedingly close to a one-degree-of-freedom vibration system.

In the present embodiment, there is described the configuration in which the yoke 22a is axially separated into the yokes 22d and 22e. However, the yokes 22d and 22e can be partially connected. This is because if the yokes 22d and 22e are completely separated, an increase in the magnetic flux leakage is taken into consideration. At this time, the coil support part 41a is partially fixed to the internal side surface of the case 10. Furthermore, the magnets 21d and 21e can also be partially connected.

The vibration power generator according to the present embodiment is configured to axially vibrate the coil as well, thereby to effectively generate electricity from a wide frequency band of external vibration and therefore can increase the amount of power generation.

Modification 1 of Second Embodiment

Figure 8:
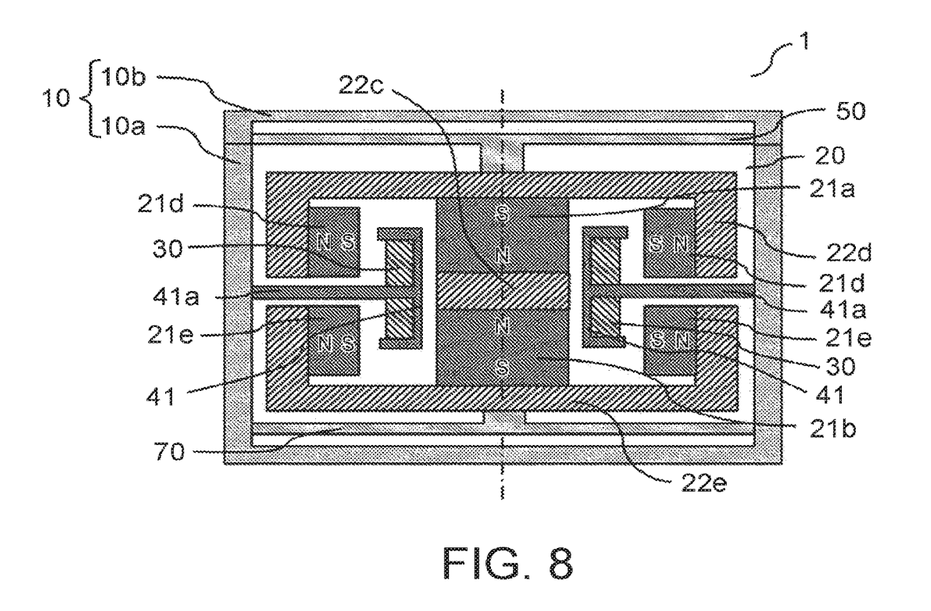
FIG. 8 is a cross-sectional view showing an outline of a vibration power generator according to modification 1 of the second embodiment.

Modification 1 of the second embodiment is described with reference to FIG. 8. FIG. 8 is a cross-sectional view showing an outline of the vibration power generator 1 according to modification 1 of the second embodiment.

As shown in FIG. 8, in modification 1 of the second embodiment, the vibration power generator 1 further includes an elastic member 70, and the elastic member 70 supports a part of the undersurface of the mover 20. Other configurations of the vibration power generator are the same as those in the second embodiment.

The shape of the elastic member 70 is a discoid shape that is the same shape as the elastic member 50. The side surface of the elastic member 70 is fixed to the internal side surface of the case 10.

In the present modification, the mover 20 is supported by being held by the elastic members 50 and 70, whereby the influence of external vibration in a direction perpendicular to the axial direction of the mover 20 is reduced, and the mover 20 can axially vibrate stably. That is, if external vibration in the direction perpendicular to the axial direction acts on the mover 20, the mover 20 is likely to vibrate in the direction perpendicular to the axial direction. However, the elastic members 50 and 70 have characteristics of high machine stiffness in an in-plane direction and low machine stiffness in an out-of-plane direction (axial direction). Therefore, by supporting the mover 20 by being held by the elastic members 50 and 70, the external vibration in the direction perpendicular to the axial direction can be supported by means of high stiffness in the in-plane direction of the elastic members 50 and 70.

Modification 2 of Second Embodiment

Figure 9:
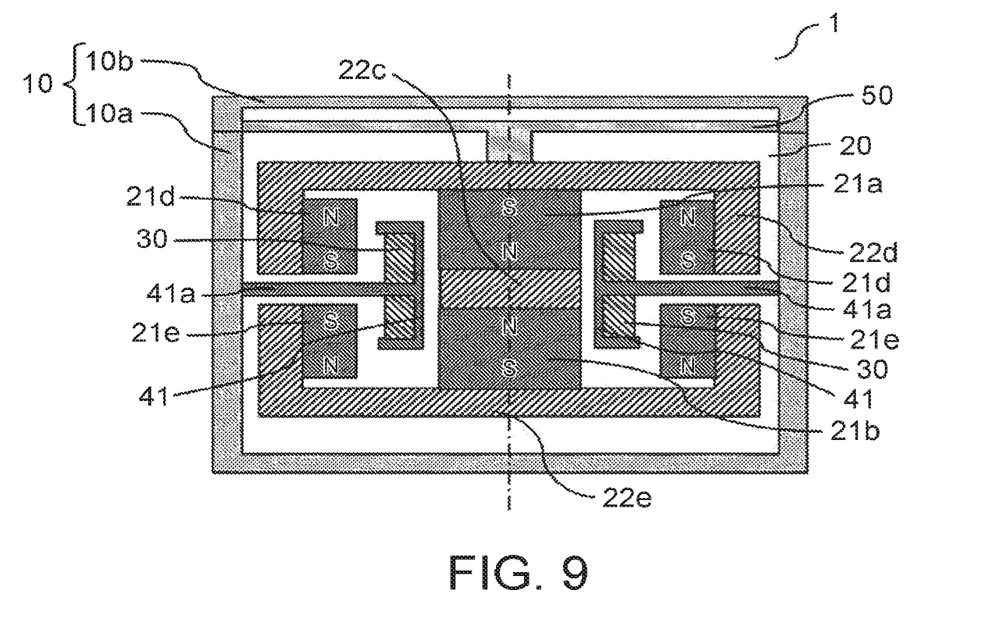
FIG. 9 is a cross-sectional view showing an outline of a vibration power generator according to modification 2 of the second embodiment.

Modification 2 of the second embodiment is described with reference to FIG. 9. FIG. 9 is a cross-sectional view showing an outline of the vibration power generator 1 according to modification 2 of the second embodiment.

As shown in FIG. 9, the vibration power generator according to modification 2 of the second embodiment differs from the second embodiment in that the magnets 21d and 21e have the magnetic poles in the axial direction. Other configurations of the vibration power generator are the same as those in the second embodiment.

Respective magnetic poles of the facing surfaces of the magnets 21d and 21e are the south pole so as to repel each other. This configuration prevents magnetic fluxes output from the magnets 21a and 21b and the yoke 22c from radiating, and can effectively interlink the magnetic fluxes with the coil 30 from the radial direction.

Furthermore, by aligning the directions of the magnetic poles of the magnets in the axial direction, magnetization of the magnets is facilitated, and the manufacturability of the mover can be improved.

Modification 3 of Second Embodiment

Figure 10:
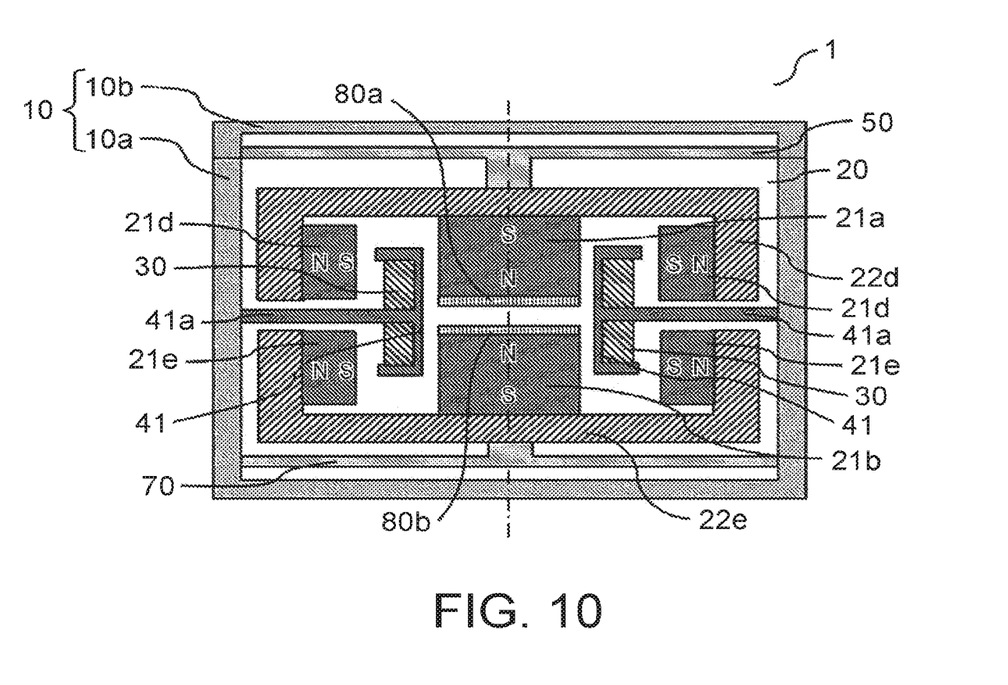
FIG. 10 is a cross-sectional view showing an outline of a vibration power generator according to modification 3 of the second embodiment.

Modification 3 of the second embodiment is described with reference to FIG. 10. FIG. 10 is a cross-sectional view showing an outline of the vibration power generator 1 according to modification 3 of the second embodiment.

As shown in FIG. 10, in modification 3 of the second embodiment, the yoke 22c is eliminated from the vibration power generator according to modification 1 of the second embodiment, and, instead, magnetic shields 80a and 80b are placed in contact with the facing surfaces of the magnets 21a and 21b, respectively. There is a gap between the magnetic shields 80a and 80b. Other configurations of the vibration power generator are the same as those in modification 1 of the second embodiment.

As material of the magnetic shields, material with high magnetic permeability is used. Accordingly, repelling force between the magnetic shields 80a and 80b is reduced.

In the case where the yoke 22a is axially separated into the yokes 22d and 22e, the vibration power generator has a three-degree-of-freedom vibration system of a system including the magnets 21a and 21d, the yoke 22d, and the elastic member 50, a system including the magnets 21b and 21e, the yoke 22e, and the elastic member 70, and a system including the coil 30 and the coil fixing member 41 having the coil support part 41a working as a spring element. Accordingly, the degree of freedom for design of the vibration power generator is high, and the vibration power generator responding to a wider frequency band of external vibration can be formed.

Furthermore, by increasing the stiffness of the coil support part 41a as described above, to set a very higher natural frequency than other systems, the vibration power generator can be configured as a substantially two-degree-of-freedom vibration system.

In the present modification, the magnetic shields are placed on the respective facing surfaces of the magnets 21a and 21b. However, if the repelling force is low, the magnetic shields do not have to be placed. Furthermore, an elastic member, such as a spring, can be placed between the magnetic shields 80a and 80b.

Third Embodiment

Figure 11:
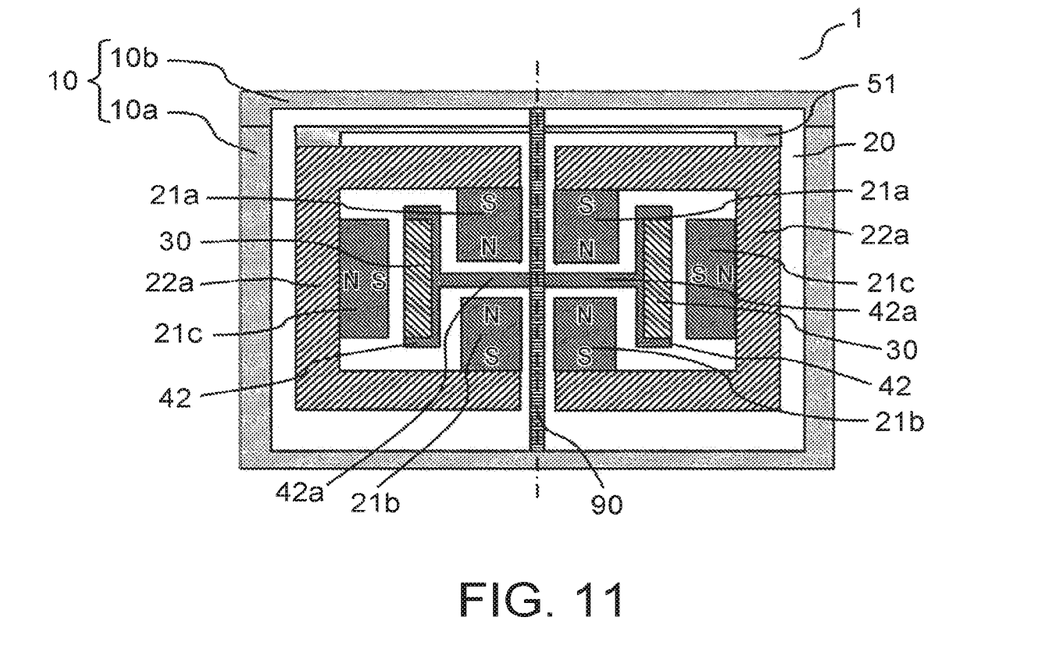
FIG. 11 is a cross-sectional view showing an outline of a vibration power generator according to a third embodiment.

A third embodiment is described with reference to FIG. 11. FIG. 11 is a cross-sectional view showing an outline of the vibration power generator 1 according to the third embodiment.

As shown in FIG. 11, the vibration power generator 1 includes a columnar shaft 90, and the shaft 90 is placed at the position corresponding to the central axis of the mover 20. The shaft 90 is fixed to the inner-wall upper surface and the bottom surface of the case 10.

The magnets 21a and 21b of the mover 20 are formed to be hollow to avoid the shaft 90. That is, the magnets 21a and 21b are formed to have an annular shape with its center hollowed out.

The yoke 22a is also formed to have a shape of avoiding the shaft 90. A through hole or the like should be formed on a portion where the shaft 90 passes through.

An elastic member 51 is fixed to a part of the side surface of the shaft 90, instead of being fixed to the inner-wall side surface of the case 10. Furthermore, the elastic member 51 is fixed to a part of the upper surface of the yoke 22a. The elastic member 51 should be fixed to the yoke 22a at the position away from the part fixed to the shaft 90.

A coil fixing member 42 is fixed to a part of the side surface of the shaft 90, instead of being fixed to the case 10. Specifically, a coil support part 42a is fixed to the shaft 90, and supports the coil 30 from a radial direction. Accordingly, the coil 30 is fixed to the inside of the mover 20. Other configurations of the vibration power generator are the same as those in the first embodiment.

The elastic member 51 can be formed to have a shape of avoiding the shaft 90 without being fixed to the shaft 90. For example, a through hole is formed on a portion of the elastic member near its central axis to avoid the shaft. In this case, a projecting boss is formed around the through hole on the elastic member 51 and is fixed to a part of the yoke 22a. Furthermore, the side surface of the elastic member 51 is fixed to the inner-wall side surface of the case 10, just like in the first embodiment.

It is preferable that material of the shaft 90 is a nonmagnetic member. For example, aluminum or austenitic stainless steel is preferable. More preferably, material of the shaft 90 should be insulating material or resin material, such as plastic material.

In the present embodiment, the yoke 22a has a closed shape, which can reduce the magnetic flux leakage from the mover 20. The magnitude of the magnetic flux linkage is increased, and the amount of power generation of the vibration power generator 1 is improved.

There is described the configuration of the vibration power generator according to any of the first to third embodiments includes one coil. However, the vibration power generator can be configured to include multiple coils. For example, in the case of two coils, the coils are arranged to be aligned in the axial direction by the coil fixing member. The winding direction of the coil can be a direction of winding coils in the reverse directions, respectively. The coils each have a lead wire, and the lead wires are connected to an output circuit to be described later separately.

Furthermore, the shapes of the case 10, the mover 20, the magnets 21a to 21e, the yokes 22a to 21e, the coil 30, and the elastic members 50 and 70 are described to be a columnar shape, a discoid shape, and an annular shape. However, the shapes are not limited to these, and can be a cuboid shape, a cubic shape, a prismatic shape, etc.

Fourth Embodiment

Figure 12:
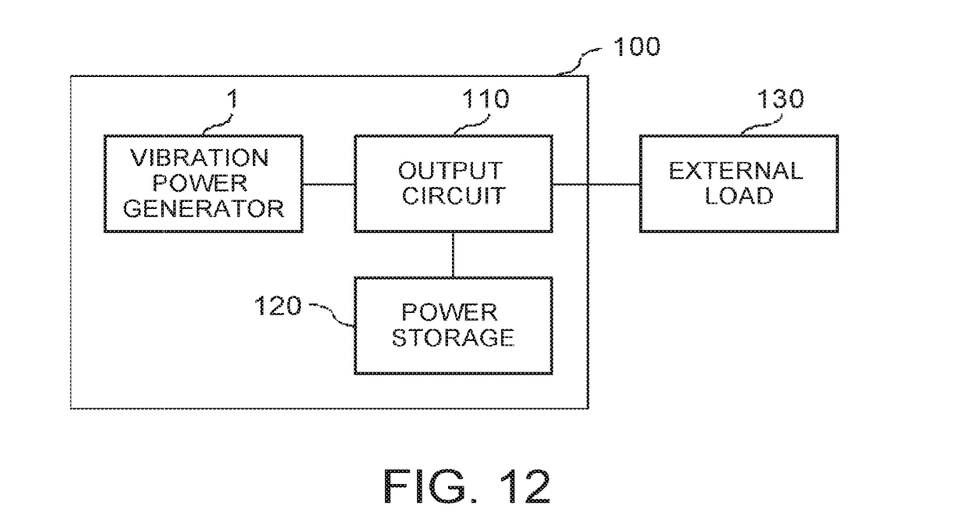
FIG. 12 is a block diagram showing a configuration of a vibration power generating unit according to a fourth embodiment.

A fourth embodiment is described with reference to FIG. 12. FIG. 12 is a block diagram showing a configuration of a vibration power generating unit 100 according to the fourth embodiment.

The vibration power generating unit 100 includes the vibration power generator 1 according to any of the first to third embodiments, an output circuit 110, and a power storage 120. The vibration power generating unit 100 is connected to an external load 130.

The output circuit 110 includes a rectifier circuit and a DC/DC converter. The rectifier circuit converts alternating-current power output from the vibration power generator 1 into direct-current power. The DC/DC converter converts direct-current power into power supply voltage required for the operations of a semiconductor chip and electronic components inside the external load 130. The output circuit 110 can further include a booster circuit for increasing the voltage.

The power storage 120 is, for example, a battery, a primary cell, a secondary cell, a capacitor, etc.

The external load 130 is sensors, etc. operated by the vibration power generating unit 100. For example, the external load 130 corresponds to various sensors such as an acceleration sensor and a temperature sensor.

An example of the vibration power generating unit in the present embodiment is described briefly below.

First, alternating-current power generated by the vibration power generator 1 is converted into direct-current power by the rectifier circuit in the output circuit 110, and the direct-current power is stored in the power storage 120.

Then, the electric power stored in the power storage 120 is converted into power supply voltage required for the operation of the external load 130 by the DC/DC converter in the output circuit 110, and the power supply voltage is supplied to the external load 130. Accordingly, the external load 130 operates.

By using the vibration power generating unit according to the present embodiment, an electrical device such as a sensor can be activated even in an environment where there is no power source (such as a battery).

Fifth Embodiment

Figure 13:
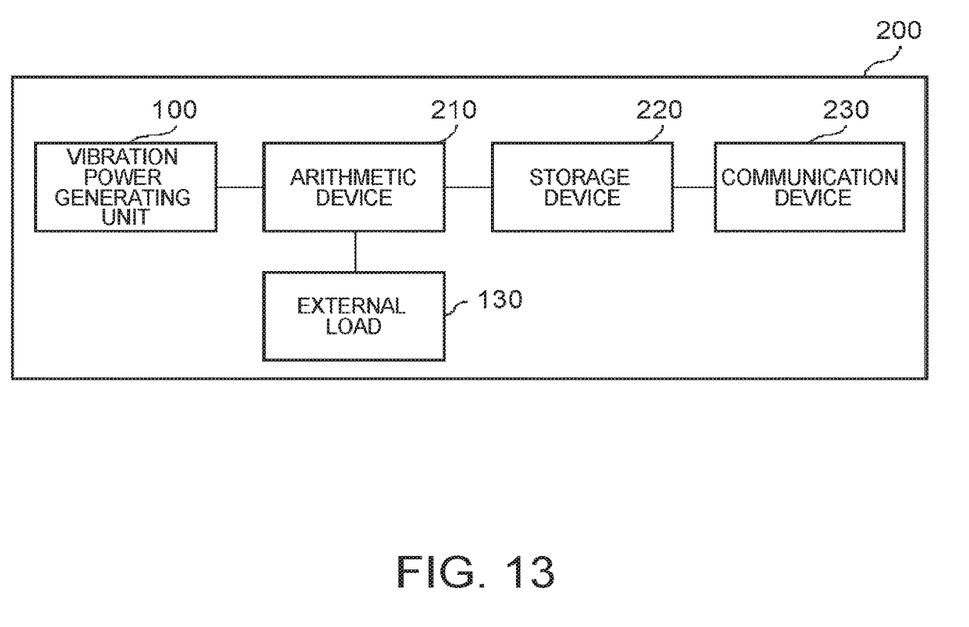
FIG. 13 is a block diagram showing a configuration of a vibration power generating module according to a fifth embodiment.

A fifth embodiment is described with reference to FIG. 13. FIG. 13 is a block diagram showing a vibration power generating module 200 according to the fifth embodiment.

The vibration power generating module 200 includes the vibration power generating unit 100 according to the fourth embodiment, an arithmetic device 210, the external load 130, a storage device 220, and a communication device 230.

The arithmetic device 210 converts data acquired from the external load 130 into a data format suited for communication. For example, the arithmetic device 210 extracts data useful for identifying the breakdown or fatigue state from vibration data of a structure. The arithmetic device 210 should be a central processing unit (CPU) or the like used in a computer.

The storage device 220 stores therein a program used by the arithmetic device 210, data of the external load 130, data converted by the arithmetic device 210, etc. For example, tape systems, such as a magnetic tape or a cassette tape, disk systems including a magnetic disk, such as a floppy (registered trademark) disk or a hard disk, and an optical disk, such as a CD-ROM, an MO, an MD, a DVD, or a CD-R, card systems, such as an IC card (including a memory card) or an optical card, or semiconductor memories, such as a mask ROM, an EPROM, an EEPROM, or a flash ROM, etc. can be used as the storage device 220.

The communication device 230 transmits data stored in the storage device 220 to an external server, etc. For example, the communication device 230 is preferably a wireless communication device. Besides this, the communication device 230 can be configured as a communication network. As the communication network, for example, the Internet, an intranet, an extra-net, a LAN, an ISDN, a VAN, a CATV communication network, a virtual private network, a telephone network, a mobile communication network, a satellite communication network, etc. can be used. Transmission media configuring the communication network are not particularly limited, for example, wired lines, such as the IEEE1394, the USB, power line carriers, cable TV lines, telephone wires, and ADSL lines, and wireless lines, such as infrared rays like IrDA or remote controllers, the Bluetooth (registered trademark), the 802.11 Wireless, HDR, mobile telephone networks, satellite circuits, and terrestrial digital networks, can be used.

The vibration power generating module 200 in the present embodiment uses the electric power generated by the vibration power generating unit 100 to operate the external load 130, the arithmetic device 210, the storage device 220, and the communication device 230. For example, by installing the vibration power generating module 200 in the present embodiment in electrical devices and infrastructure equipment, such as trains, airplanes, roads, and bridges, information of the infrastructure equipment, etc. can be obtained without adding power supply facilities. Furthermore, data can be transferred from the communication device 230 to an external server or the like, and information of infrastructure equipment can be stored in the external server, or can be analyzed in the external server.

Furthermore, the vibration power generating module 200 in the present embodiment can also be installed in vehicles, motors, and electrical devices such as mobile terminals. The vehicles here include cars, trains, motorcycles (including motorized bicycles), bicycles, airplanes, combat vehicles, etc. Vehicles, motors, and electrical devices such as mobile terminals have a printed circuit with a semiconductor or an integrated circuit (IC) mounted. For example, by mounting the vibration power generating module 200 on a mobile terminal, the acceleration or the like when an impact is applied to the mobile terminal by a user dropping the mobile terminal when turning the mobile terminal off can be detected.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vibration power generator comprising:
   a housing;
   a first elastic member fixed to the housing;
   a second elastic member fixed to the housing;
   a mover supported by being held by the first elastic member and the second elastic member, and able to vibrate in a first direction; and
   a coil positioned inside the mover, wherein
   the mover includes
     a first magnet,
     a second magnet placed to be aligned with the first magnet in the first direction so as to repel each other,
     a third magnet placed annularly with respect to the first magnet and the second magnet,
     a fourth magnet aligned with the third magnet in the first direction,
     a first magnetic yoke surrounding the first magnet and the third magnet, and
     a third magnetic yoke facing the first magnetic yoke and surrounding the second magnet and the fourth magnet,
   the coil is positioned between both the first magnet and the second magnet, and both the third magnet and the fourth magnet,
   a center of an upper surface of the first magnetic yoke is connected to the first elastic member near a central axis of the housing in the first direction, and
   a center of a bottom surface of the third magnetic yoke is connected to the second elastic member near the central axis of the housing in the first direction.

2. The vibration power generator according to claim 1, wherein the mover further includes a second magnetic yoke between the first magnet and the second magnet.

3. The vibration power generator according to claim 1, wherein the third magnet has magnetic poles in the second direction.

4. The vibration power generator according to claim 1, further comprising:
   a first magnetic shield and a second magnetic shield placed in contact with facing surfaces of the first magnet and the second magnet respectively so as to have a gap between the first magnetic shield and the second magnetic shield.

5. A vibration power generating unit comprising:
   the vibration power generator according to claim 1; and
   at least one of a power storage and an output circuit.

6. A vibration power generating module comprising:
   the vibration power generating unit according to claim 5; and
   at least one of a communication device and an external load.

7. An electrical device comprising:
   the vibration power generating module according to claim 6; and
   a circuit board with electronic components mounted.

8. The vibration power generator according to claim 1, wherein
   the first magnet and the second magnet pass a magnetic flux through in a second direction intersecting the first direction, and
   the coil is supported by the housing from the second direction.

9. The vibration power generator according to claim 8, further comprising:
   a coil fixing member fixed to an internal side surface of the housing;
   wherein the coil is fixed to a lateral surface of the coil fixing member.

10. The vibration power generator according to claim 9, wherein
    the third magnet and the fourth magnet have magnetic poles in the second direction, and
    respective magnetic poles of the third magnet and the fourth magnet on the side facing the coil are the same magnetic pole.

11. The vibration power generator according to claim 9, wherein
    the third magnet and the fourth magnet have magnetic poles in the first direction, and
    respective magnetic poles of facing surfaces of the third magnet and the fourth magnet are the same magnetic pole to repel each other.

* * * * *